United States Patent [19]
Dawson et al.

[11] Patent Number: 5,230,374
[45] Date of Patent: Jul. 27, 1993

[54] MOBILE LIQUID TRANSFERRING APPARATUS

[75] Inventors: David W. Dawson, Naperville; James E. Schoeckel, Midlothian, both of Ill.

[73] Assignee: R. R. Street & Company, Inc., Oak Brook, Ill.

[21] Appl. No.: 718,023

[22] Filed: Jun. 20, 1991

[51] Int. Cl.⁵ .............................................. B65B 3/18
[52] U.S. Cl. .................................... 141/231; 141/65; 141/59; 141/18; 141/294
[58] Field of Search ...................... 141/231, 52, 59, 65, 141/18, 2, 66, 46, 293, 294

[56] References Cited

U.S. PATENT DOCUMENTS

| | | | |
|---|---|---|---|
| 1,406,380 | 2/1922 | Heath et al. | 141/66 |
| 3,075,662 | 1/1963 | Da Prato et al. | |
| 3,148,712 | 9/1964 | Zellweger | 141/293 |
| 3,171,448 | 3/1965 | Fromm | 141/293 |
| 3,384,132 | 5/1968 | Lisciani | 141/18 |
| 3,776,283 | 12/1973 | Kramer et al. | 141/45 |
| 3,863,688 | 2/1975 | Millar et al. | 141/59 |
| 3,920,056 | 11/1975 | Piecuch | 141/94 |
| 4,053,001 | 10/1977 | Healey et al. | 141/2 |
| 4,074,734 | 2/1978 | De Beau et al. | 141/52 X |
| 4,144,915 | 3/1979 | Henderson | 141/18 |
| 4,195,672 | 4/1980 | Freeman | 141/91 |
| 4,640,327 | 2/1987 | Norcia et al. | 141/18 |
| 4,741,368 | 5/1988 | Crumby | 141/18 |
| 4,796,677 | 1/1989 | Nice | 141/88 |
| 4,888,849 | 12/1989 | Hult et al. | 15/327 |
| 4,890,983 | 1/1990 | Solomon et al. | 417/41 |
| 4,932,445 | 6/1990 | Biehl | 141/83 |
| 4,988,020 | 1/1991 | Webb | 141/88 X |
| 5,033,492 | 7/1991 | Mertens et al. | 141/59 X |
| 5,078,187 | 1/1992 | Sharp | 141/198 |

Primary Examiner—Ernest G. Cusick
Attorney, Agent, or Firm—Wallenstein, Wagner & Hattis, Ltd.

[57] ABSTRACT

The invention is a mobile apparatus for transporting a liquid. The apparatus includes a wheeled frame and a pump, with a suction and a discharge port, that is supported by that frame. A liquid storage container is supported upon the wheeled frame. A fitting secured to the liquid storage container includes an integral liquid head. The apparatus further includes an inlet transfer line between the integral liquid head and the suction port of the pump. Finally, the apparatus includes an outlet transfer line from the discharge port of the pump for transfer of the liquid to a remote container.

9 Claims, 2 Drawing Sheets

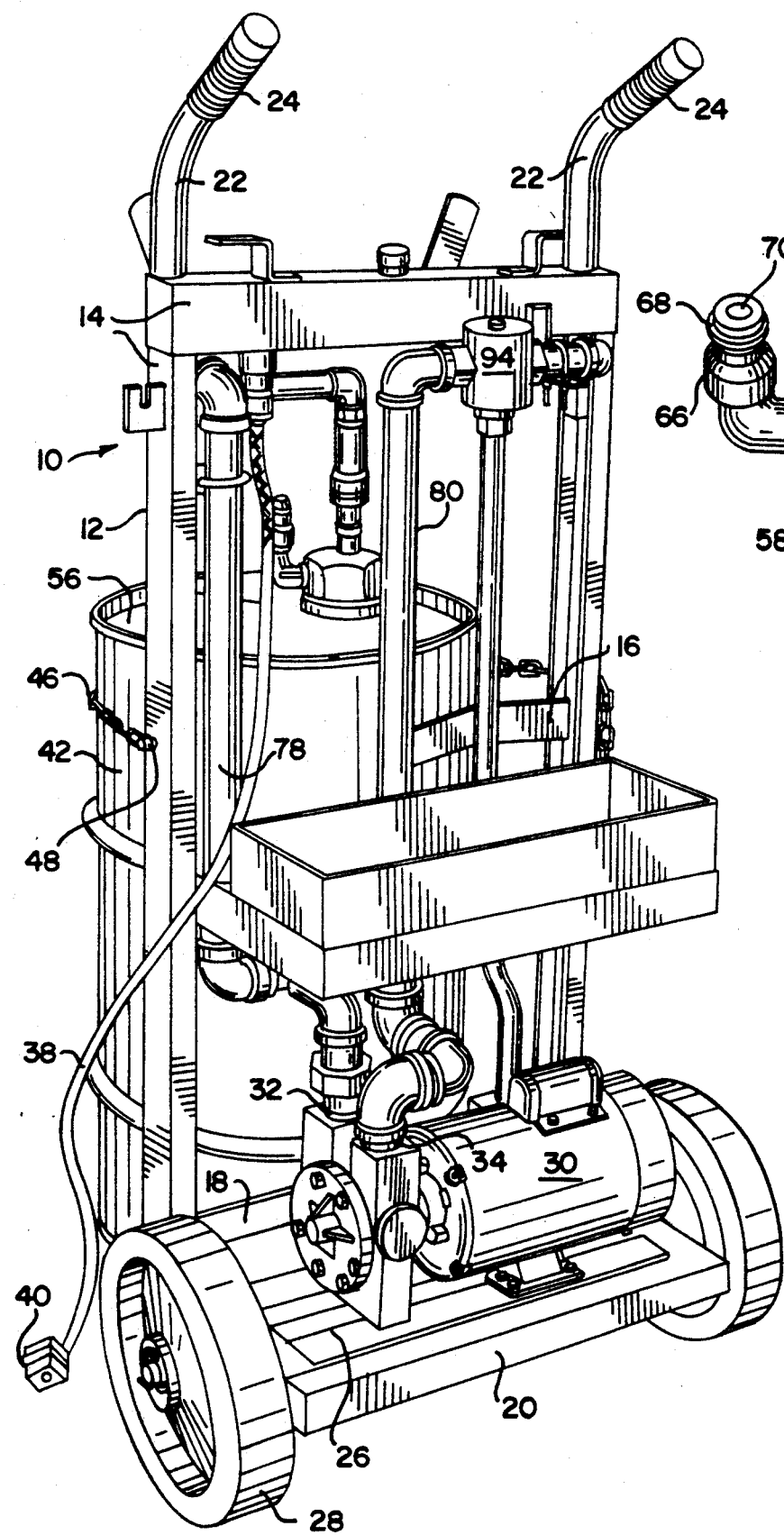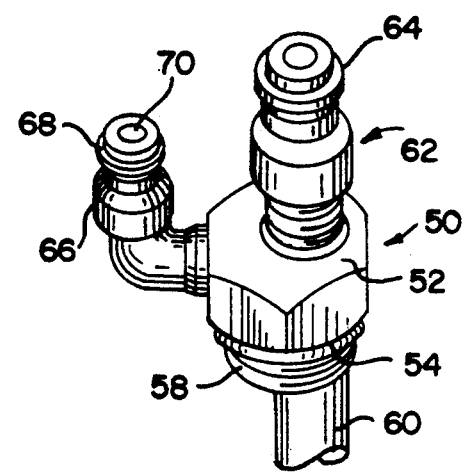

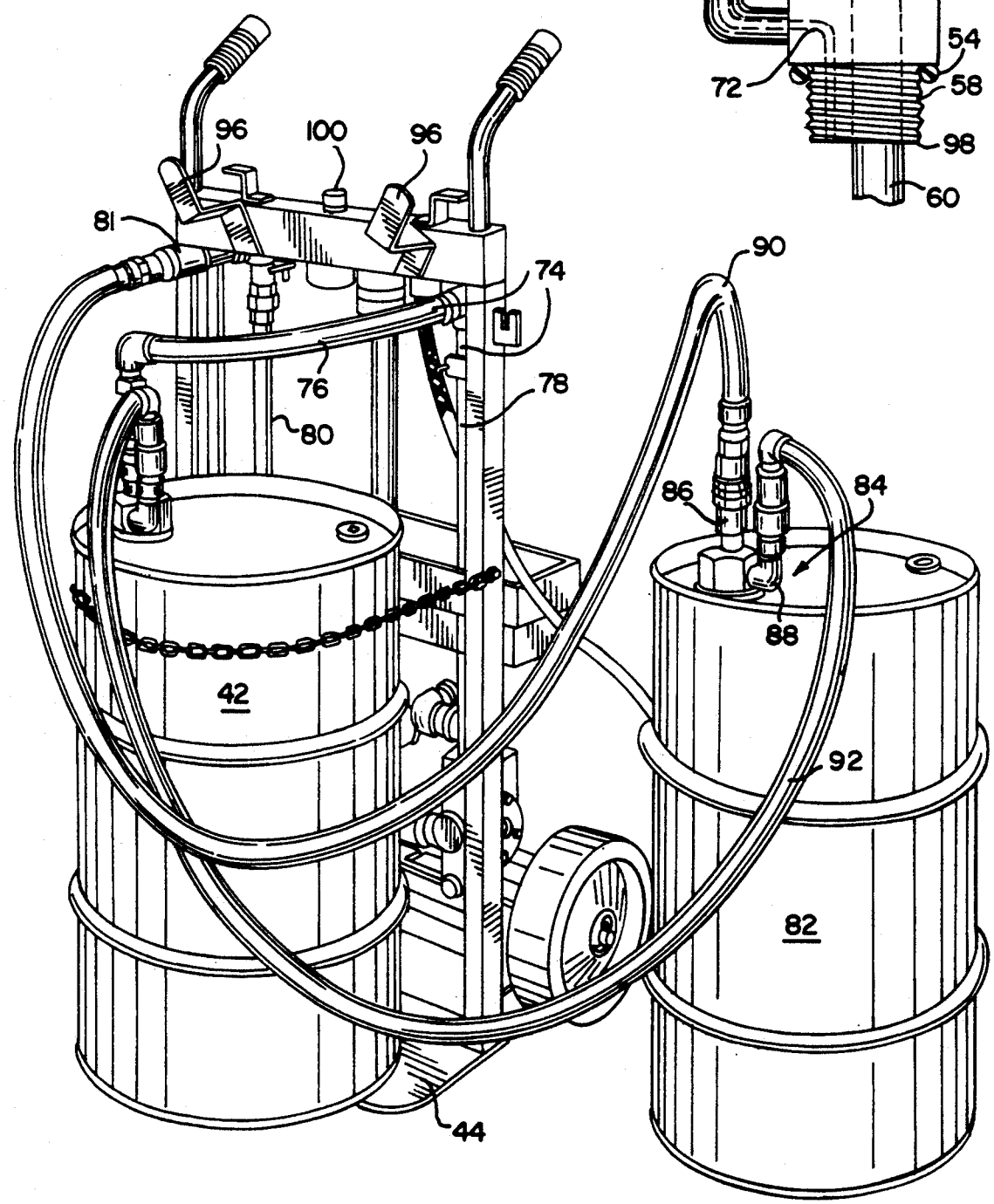

MOBILE LIQUID TRANSFERRING APPARATUS

TECHNICAL FIELD

This invention pertains to a mobile liquid transferring apparatus. In particular, this invention pertains to an apparatus suitable for transferring solvents, such as perchlorethylene, with a minimum loss of the solvent through evaporation.

BACKGROUND OF THE INVENTION

The most important single solvent used by dry cleaners in the United States is tetrachloroethylene ($Cl_2$—C=C—$Cl_2$), more commonly known as perchlorethylene or "perc." Perc is a liquid at room temperature and pressure, and is mostly used in closed-to-atmosphere systems that are a part of commercial dry cleaning machines. Perc losses mainly occur through ventilation, waste disposal and residual loss on garments being cleaned. The loss of perc results in a sweet odor that is common in and near virtually all dry cleaning plants.

When sufficient perc has been lost by a dry cleaning plant, additional perc is ordered from a distributor. The distributor typically obtains the perc from a manufacturer and stores it in large storage tanks. Delivery from the distributor to the dry cleaning plant is frequently done with tanker trucks. In a manner similar to the delivery of home heating oil, these trucks are driven to a point near the plant. A perc transfer hose is extended from the truck to the plant's storage tank inlet, which is well inside the dry cleaning plant.

This current delivery method has many drawbacks. First, perc is a volatile organic compound (VOC). Beginning in December 1992, OSHA regulations will require engineering controls to achieve a maximum permissible exposure level (PEL). The current delivery method uses an open-to-atmosphere hose fitting which is merely inserted into the plant's storage tank inlet. Using this method, these 1992 limits cannot be met.

Second, the relatively long hose between the tanker truck and the dry cleaning plant is subject to rupture or leakage because of non-obvious wear, vandalism and accident. The perc discharge resulting from such rupture or leakage causes uncontrolled loss of the solvent and creates personal safety, environmental and traction hazards.

Third, the current delivery method often requires a specialized and expensive tanker truck.

Fourth, large spills can occur in the event of a traffic accident that ruptures the tank on the truck.

Other delivery methods do not require the use of tanker trucks, but have other drawbacks. Perc may be delivered in fifty-five gallon drums. The distributor may off-load these drums using a pump suction tube that is moved from drum to drum for each delivery. Alternatively, the drums may be emptied by dry cleaners themselves through the use of manual drum pumps or small electric transfer pumps and hoses. Many dry cleaning establishment proprietors, however, would rather not be responsible for such emptying, and would prefer to leave transfer in the hands of the distributor.

Several U.S. patents are cited as background for this invention. De Prato et al. U.S. Pat. No. 3,075,662 was issued on Jan. 29, 1963, and is entitled "Hand Truck " This patent describes a hand truck which may be knocked down and reassembled, and in which a wheel shaft interlocks the various parts in a fixed position.

Lisciani U.S. Pat. No. 3,384,132 was issued on May 21, 1968, and is entitled "Flammable Liquid Transfer Station." The invention described depends upon a diaphragm and spring arrangement to move the flammable liquid.

Piecuch U.S. Pat. No. 3,920,056 was issued on Nov. 18, 1975, and is entitled "Portable Automatic Drum Filling Apparatus." The invention relies upon a product level detecting assembly including a filling nozzle and a pair of fluidic product level sensing probes.

Healey et al. U.S. Pat. No. 4,053,001 was issued on Oct. 11, 1977, and is entitled "Method for Charging a Fire Protection System." The method invention described in this patent requires weighing of the fire-extinguishing agent that is being recharged. The apparatus described in this patent requires fluid heating or cooling means.

Henderson U.S. Pat. No. 4,144,915 was issued on Mar. 20, 1979, and is entitled "Liquid Supply Measuring and Dispensing Apparatus." This apparatus claims and requires a dispensing nozzle below the bottom wall of a liquid compartment, nozzle operating means and shut-off means in the dispensing nozzle.

Freeman U.S. Pat. No. 4,195,672 issued on Apr. 1, 1980, and is entitled "Portable Liquid Pesticide Transfer Assembly." This device is disclosed as being typically mounted to a truck. Most of its embodiments also require a complex valve system.

Crumby U.S. Pat. No. 4,741,368 was issued on May 3, 1988, and is entitled "Returnable Container for Liquid Chemicals and Fitting Therefor." The device of this invention discloses a fitting for mounting in the lid of a closed container for dispensing liquid chemicals.

Nice U.S. Pat. No. 4,796,677 was issued on Jan. 10, 1989, and is entitled "Apparatus for Facilitating Liquid Transfer From a Drum." This apparatus is not wheeled or mobile and requires a receptacle, including a conical member.

Hult et al. U.S. Pat. No. 4,888,849 was issued on Dec. 26, 1989, and is entitled "Wheeled Hand Cart for Wet/Dry Utility Vacuum Cleaner." This device requires a handle interconnecting two separate upright handle sections for facilitating movement of the drum of the vacuum cleaner.

Solomon et al. U.S. Pat. No. 4,890,983 was issued on Jan. 2, 1990, and is entitled "Above-Ground Storage System." This device is apparently non-movable, and requires a tank within a tank.

Biehl U.S. Pat. No. 4,932,445 was issued on Jun. 12, 1990, and is entitled "Subsurface Filler." The invention disclosed in this patent is for the subsurface filling of a container with a liquid from a liquid source using a pneumatic cylinder apparatus.

Other patents of general interest include Solomon et al. U.S. Pat. No. 4,948,340, issued on Aug. 14, 1990, and entitled "Above-Ground System"; Evenson U.S. Pat. No. 4,924,898, issued on May 15, 1990, and entitled "Vacuum Assisted Material Mover"; and Apel U.S. Pat. No. 4,875,906, issued on Oct. 24, 1989, and entitled "Partial Oxidation of Low Heating Value Hazardous Waste Petroleum Products."

SUMMARY OF THE INVENTION

The invention is a mobile apparatus for transporting a liquid. The apparatus includes a wheeled frame and a pump, with a suction and discharge port, that is supported by that frame. A liquid storage container is supported upon the wheeled frame. A fitting secured to the liquid storage container includes an integral liquid head. The apparatus further includes an inlet transfer line between the integral liquid head and the pump suction port. Finally, the apparatus includes an outlet transfer line from the discharge port of the pump for transfer of the liquid to a remote container.

Further aspects of the invention include an integral vapor head on the fitting. This vapor head has an orifice which enables its communication with the interior of the liquid storage container. The fitting is secured to the top of the liquid storage container through a threaded portion that is preferably coaxial with the conduit. Vapor transfer lines are provided for securement to the vapor head of the fitting, and to a corresponding vapor head on the remote container. For safety, the pump can be operated only with a so-called "dead-man" switch.

One object of the invention includes the provision of an apparatus which will enable containment of volatile organic compounds (VOC) so that perc delivery can meet pending OSHA limits. Another object of the invention is the elimination of the relatively long hose between the tanker truck and the dry cleaning plant. This will also result in the elimination of perc discharge resulting from rupture or leakage in such hoses and its attendant uncontrolled loss of the solvent. A third object of the invention is the elimination of the need for a specialized and expensive tanker truck for perc deliveries to dry cleaning plants. A fourth object of the invention is a compact apparatus which accomplishes all of these objects and yet is of simple construction, lightweight, rugged and of relatively low cost. A fifth object of the invention is a device which eliminates the need to leave a perchlorethylene package with the dry cleaner, which also facilitates recycling of that package and avoids a waste disposal problem.

BRIEF DESCRIPTION OF THE DRAWINGS

FIG. 1 is a perspective view of the back side of an apparatus in accordance with the preferred embodiment of the invention.

FIG. 2 is a perspective view of the front side of the apparatus of FIG. 2, and showing that apparatus connected to a remote container into which liquid is to be transferred.

FIG. 3 is a perspective view of a fitting in accordance with the invention.

FIG. 4 is a side sectional view of the fitting of FIG. 3.

DETAILED DESCRIPTION OF THE PREFERRED EMBODIMENT

A preferred embodiment of the invention is shown in the figures accompanying this specification. Referring now to those figures, and especially FIG. 1, the invention is a mobile apparatus 10 for transporting a liquid. In the embodiment shown, the liquid to be transferred is tetrachloroethylene, commonly known in the dry cleaning industry as perchlorethylene or simply "perc." Perc is a liquid at room temperature and pressure. Perc is listed by the Environmental Protection Agency (EPA) as a hazardous substance for the purpose of regulating waste and air pollutants.

As may also be seen from FIG. 1, the apparatus 10 includes a wheeled frame 12. In this embodiment, this wheeled frame 12 is constructed from four C-shaped or box-like beams 14 which are welded together at their corners. This wheeled frame 12 must support a substantial mass and is subject to flexing forces when being moved. Thus, for additional rigidity and structural support, metal cross pieces 16 and 18 are welded to the wheeled frame 12. As will be seen, a rigid rectangular platform 20, having dimensions of approximately 10 by 20 inches by ¼ inch, serves as a base for several important components of the apparatus 10.

A pair of upright handles 22 with corresponding rubber handle grips 24 facilitate movement of the apparatus 10. The handle grips 24 are available from McMaster Carr as Model No. 9729K73. An axle 26 is secured to the rectangular platform 20 and a pair of wheels 28 are fixed to the ends of that axle 26. The axle 26 is 23 inches in length and ¾ inch in diameter. The wheels 28 are manufactured by Bronco Wheel as Model No. 10250-UV.

The apparatus 10 is designed for fluid transfer. To facilitate this transfer, the apparatus 10 is provided with a pump 30 having a suction port 32 and a discharge port 34 at its impeller 36. The pump 30 is secured to and supported upon the platform 20 of the wheeled frame 12. In this embodiment, the pump 30 is electrically powered Model Lev CA, manufactured by Tuthill. The pump 30 is powered by 110 V electrical current. Power is provided through an eight-foot length of 16 gauge, 3-element electrical cord 38 and its grounded plug 40.

The fluid to be transferred by this pump 30 is contained in a cylindrical liquid storage container 42. That container is substantially supported upon a flat plate 44 that is welded to the wheeled frame 12. Metal cross pieces 16 and 18 also provide support to the container 42 when it is being moved. Thus, as seen in FIG. 1, one or both of those cross pieces 16 and 18 may be bowed outwardly slightly to more closely correspond to the shape of the liquid storage container 42. In this way, the cross pieces 16 and 18 will more effectively cradle the container 42. In this embodiment, the liquid storage container 42 has a capacity of approximately 20 gallons.

To secure the container 42 against significant movement during transport, a link chain 46 is provided. This link chain is wrapped snugly around the container 42 and its ends are secured to hook-like clasps 48 on opposing vertical beams 14. To account for variations in the diameters of containers 42, any of various links of the link chain 46 may be secured to one of the clasps 48.

A special fitting is provided to enable transfer of the liquid, to control the liquid level in and vapor transfer between containers, and to prevent spillage of perc because of operator errors which would ordinarily cause overfilling and spillage. This fitting 50 may be seen in more detail in FIGS. 3 and 4. FIG. 3 shows a perspective view of the fitting 50, and FIG. 4 shows a side sectional view of that same fitting 50. The fitting 50 is comprised of a large, mushroom-shaped coupling 52 portion. This coupling 52 forms the base of the fitting 50, to which all other components of the fitting 50 are attached. The coupling 52 includes flats to enable turning of the fitting with a wrench.

This fitting 50 is normally secured to the liquid storage container 42. To prevent evaporation of the solvent through a threaded opening while the fitting is secured to the top of the container 42, a polymeric O-ring 54 is secured to the base of the coupling 52. The fitting 50 is secured to the threaded opening of the top 56 of the container 42 with a threaded portion 58. This threaded portion 58 is preferably coaxial with a suction tube or conduit 60 that extends to the bottom of the liquid storage container 42. Liquid perc is filled and removed through this conduit 60. This threaded portion 50 provides the means for securing fitting 50 to the top 56 of the liquid storage container 42.

The fitting 50 includes an integral liquid head 62. One function of this liquid head 62 is to facilitate emptying of container 42, i.e., transfer of the liquid from the container 42 on the wheeled frame 12. As will be seen, this same liquid head 62 on another fitting secured to another container can also provide for the filling, rather than merely the emptying, of a container.

The liquid head 62 includes an end comprising a male nipple 64 manufactured by the Parker Hannifin Company, Quick Coupling Division, 8145 Lewis Road, Minneapolis, Minnesota 55427. The nipple 64 of the liquid head 62 shown in fitting 50 of FIG. 3 is Part No. (steel) 4110-5, with a body size of ¾ inch. A spring-biased ball (not shown) is located along the axis of the nipple 64. This ball is normally fitted tightly to a surrounding supporting structure of the nipple 64. In this position, the ball creates a liquid-tight seal, preventing the passage of perc through the nipple 64. As will be seen, however, a female coupler, upon securement with male nipple 64, pushes against this ball and opens the nipple 64 to permit two-way passage of liquid, i.e., passage in either direction.

Fitting 50 also includes an integral vapor head 66. The vapor head 66 includes a nipple 68, which is also manufactured by the Parker-Hannifin Quick Coupling Division, 8145 Lewis Road, Minneapolis, Minnesota 55427. The nipple 68 is sold as Part No. 8010-4 with a body size of ½ inch. A spring-biased ball 70 is located along the axis of the nipple 68. This ball is normally fitted tightly to a surrounding supporting structure of the nipple 68. In this position, the ball 70 creates a liquid- and vapor-tight seal, preventing the passage of perc or its vapors through the nipple. As will be seen, however, a corresponding female coupler, upon securement with nipple 68, pushes against this ball 70 and opens the nipple 68 to permit two-way passage of both liquid and vapor.

Referring now to FIG. 4, an orifice 72 is provided for liquid and vapor communication between the integral vapor head 66 and the interior of the liquid storage container 42. Through this orifice 72, there is an open path between the ball 70 of the nipple 68 and the bottom of the container to which it is attached.

Having now described the general features of the invention, FIG. 2 may be viewed to aid in understanding the mode of its operation. An inlet transfer line 74, comprising a short section of flexible hose 76 and another section of rigid cylindrical piping 78, is disposed between the liquid head 62 and the suction port 32 of pump 30. An outlet transfer line 80, comprising a section of rigid cylindrical piping and the necessary elbows and other conventional fittings, is disposed between the discharge port 34 of the pump 30 and a female coupling 81. This coupling 81 is Part No. 4150-5, with a body size of ¾". This outlet transfer line 80 facilitates the transfer of liquid in the liquid storage container 42 to another remote container 82.

For illustrative purposes, the remote container 82 of FIG. 2 is identical to liquid storage container 42. It is to be understood, however, that the remote container to which perc will be transferred by the apparatus of the invention will more typically be a storage tank or dry cleaning machine (not shown) at the commercial cleaning plant of a professional dry cleaner.

Remote container 82 includes its own fitting 84. This fitting 84 is identical in all respects to fitting 50 attached to the top of liquid storage container 42, except that it does not have a conduit such as 60. As may be seen in FIG. 2, fitting 84 includes its own liquid head 86 and vapor head 88.

A flexible hose 90 secures the female coupling 81 to liquid head 86 of fitting 84. One end of this flexible hose 90 has a male nipple compatible in size and function with female coupling 81. The other end has a female coupling compatible with male nipple on the liquid head of receiving tank 82. When all components of this system are connected as shown in FIG. 2 and the pump 30 is started, liquid perc is transferred from liquid storage container 42 through the inlet transfer line 74, outlet transfer line 80, flexible hose 90 and liquid head 86 into the remote container 82.

As indicated above, fitting 50 and fitting 84 both include liquid heads having a nipple (nipple 64 is attached to fitting 50) manufactured by the Parker Hannifin Company, Quick Coupling Division, 8145 Lewis Road, Minneapolis, Minnesota 55427. The seal formed by the spring-biased balls (not shown) located along the axes of these nipples is opened when the nipple is secured to a corresponding female coupler. A pushing action against this ball opens the nipple 64 to permit passage of liquid. Corresponding couplers are also available from the Quick Connect Division of Parker Hannifin. The appropriate size and type of coupler will be obvious to those skilled in this art. By way of example, however, the female coupler corresponding to nipple 64, which is Part No. (steel) 4110-5, with a body size of ¾ inch, is coupler Part No. 4150-5, with a body size of ¾ inch.

As explained above, each coupler also includes similar, spring-biased balls which also form liquid-tight seals. The balls in these couplers are moved aside to permit liquid flow upon mating with their compatible nipple. In this way, the couplers also provide a liquid-tight seal when not connected to their corresponding nipple.

One or more vapor transfer lines 92 are provided for securement to the vapor head 66 of fitting 50 with the vapor head 88 of fitting 84. In the preferred embodiment, only one vapor transfer line 92 is necessary. Both ends of the vapor transfer line 92 include female quick connect couplings that are compatible with nipple 68. Nipple 68 is manufactured by the Parker-Hannifin Quick Coupling Division, and sold as Part No. 8010-4.

This vapor transfer line 92 has two distinct purposes. First, it provides a means of capturing vapors and recirculating those vapors between containers 42 and 82. This prevents discharge of vapors into the atmosphere. Second, it provides a measure of overfilling protection. In the event that the remote container 82 were filled to the bottom 98 of the threaded portion 58 and the operator continued to pump perc from the liquid storage container 42, the excess perc in the remote container 82 would immediately be returned to the liquid storage container 42 through a path comprising the orifice (not shown) of the vapor head 88, the vapor head 88, the vapor transfer line 92 and the vapor head 66.

As discussed above, overflow transfer of perc from the remote container 82 to the liquid storage container 42 occurs when perc reaches the bottom 98 of the threaded portion 58 of the fitting 84. Thus, the length of this threaded portion 58 determines the maximum amount of head space in the remote container 82. This same principle applies to the threaded portion 58 of fitting 50. In this same way, the length of the threaded portion 58 of this fitting 50 determines the maximum amount of head space in liquid storage container 42. This feature avoids spills, worker exposure to hazardous vapor, overfilling and more complex methods of measurement, such as scale weighing.

As will be appreciated, "closeable" couplings are thus provided at the ends of each of the lines or hoses used to transfer liquid or vapor perc. In this embodiment, these "closeable" couplings take the form of couplers or nipples with liquid- and/or vapor-tight, spring-loaded balls. For example, "closeable" couplings are provided at the ends of the vapor heads and the vapor transfer lines. These "closeable" couplings will close upon removal of the vapor transfer line 92 from the two vapor heads 66 and 88.

Three additional features are shown in the figures. FIG. 1 shows that a ⅜ inch sight glass 94 (Model E573, manufactured by W. E. Anderson Co.) is placed in the outlet transfer line 80. By viewing this sight glass 94, the operator will know whether perc is being transferred to the remote container 82 or whether the supplying liquid storage container 42 has been emptied. Similar sight glasses are available from a variety of well-known manufacturers, and are acceptable for use in the invention.

FIG. 2 shows a pair of arms 96 secured at the top of the apparatus 10. For convenience during storage and transfer of the apparatus 10, flexible hose 90 and vapor transfer line 92 may be wrapped around these arms 96. FIG. 2 also shows a so-called "dead man" switch 100, which is available from Allen Bradley as Switch No. 800 TD 2A2. By appropriate wiring, the pump 30 will be operated only upon manual depression of this switch 100.

It may be seen that the invention solves many of the problems with prior art methods of distributing perc. First, the invention provides an apparatus having a vapor return system which will enable containment of volatile organic compounds (VOC). Perc delivery can thus meet pending OSHA limits. Second, the invention eliminates the relatively long hose between the tanker truck and the dry cleaning plant. This will eliminate perc discharge resulting from rupture or leakage in such hoses and its attendant uncontrolled loss of solvent.

Third, the invention eliminates the need for a specialized and expensive tanker truck for perc deliveries to dry cleaning plants. With this invention, the apparatus and its perc containers can be shipped in non-specialized, general purpose trucks. Fourth, this apparatus accomplishes all of these objects and yet is of simple construction, lightweight, rugged and made at a relatively low cost.

While the specific embodiments have been illustrated and described, numerous modifications come to mind without markedly departing from the spirit of the invention. The scope of protection is thus only intended to be limited by the scope of the accompanying claims.

What we claim is:

1. A mobile assembly for transporting a liquid which can be hazardous if leaked to the atmosphere, said assembly adapted to be connected to a remote container having an interior storage space and further having a vapor head and a liquid head on the top of said remote container, with a passageway extending between the exterior of each of said heads and said storage space, with normally closed valves blocking passage of liquid or vapor through said passageways, said assembly comprising: a wheeled frame; a pump having a suction and a discharge port, said pump being supported by said wheeled frame; a liquid storage supply container supported upon said wheeled frame and having an interior storage space; a liquid head and a vapor head secured to the top of said liquid storage supply container, said vapor head including a passageway extending between the exterior of said vapor head and the top of said interior storage space of the supply container permitting passage of liquid or vapor between the vapor head and the supply container; an inlet tube extending from the liquid head of said supply container to the bottom portion of said storage space, said liquid head on said supply container having a passageway extending between its exterior and said inlet tube; an inlet liquid transfer line between said liquid head and the suction port of said pump; an outlet liquid transfer line connected at its inner end to the discharge port of said pump, its outer end adapted to be connected to said liquid head of said remote container for the transfer of said container and its opposite outer end adapted to be connected to the vapor head of said remote container; an initially closed valve associated with each of said liquid and vapor transfer lines for sealing said transfer lines; and valve-opening means for opening said normally closed valves so that the storage spaces of said supply and remote containers are interconnected, thereby permitting passage of vapor and liquid between said supply and remote containers, upon opening of the valves in the passageways of said vapor and liquid heads of said remote container.

2. The mobile assembly of claim 1, wherein said liquid and vapor head on said supply container are parts of a single fitting which includes a threaded body portion threadably secured to the top of said supply container, the length of said threaded portion determining the maximum amount of head space in said supply container.

3. The mobile assembly of claim 1, further comprising a dead man switch for operation of said pump.

4. The mobile assembly of claim 1 wherein each of said valves in said vapor and liquid head passageways on said supply container comprises a ball, said ball being movable by coupling means to open said vapor head to two-way passage of both liquid and vapor.

5. The mobile assembly of claim 1 wherein the outer ends of said outlet liquid and vapor transfer lines are adapted to be connected, respectively, to the liquid and vapor heads of said remote container, each outer liquid and vapor transfer line having one of said normally closed valves, each of said normally closed valves being spring biased, and said valve-opening means being coupling means on the ends of said outlet liquid and vapor transfer lines for opening the valves in said liquid and vapor head passageways on said remote container upon connection of the outer ends of said outlet liquid and vapor transfer lines to said liquid and vapor heads of said remote container.

6. The mobile assembly of claim 1 wherein said liquid and vapor heads of said remote container are part of one integral fitting, said fitting including a threaded body portion threadedly secured to the top of said liquid storage container, the length of said threaded portion determining the maximum amount of head space in said remote container, the passageway in the vapor head of said fitting on said storage container extending down to the bottom of said threaded body portion so that any liquid in said remote container which reaches the bottom of said body portion can flow back through said outlet liquid transfer line into said storage container.

7. The mobile assembly of claim 4 wherein said supply container has liquid perchlorethylene therein.

8. In combination: a remote container having an interior storage space for receiving a liquid which can be hazardous if leaked to the atmosphere; a mobile assembly for transporting said liquid to said remote container, said assembly comprising: a wheeled frame, a pump having a suction and a discharge port, said pump being supported by said wheeled frame, and a liquid storage supply container supported upon said wheeled frame and having an interior storage space; a liquid head and a vapor head secured to the top of each of said liquid storage supply and remote containers; a passageway in the liquid head of said remote container extending between the exterior of said liquid head and the storage space of the remote container; an inlet tube extending from the liquid head of said supply container to the bottom portion of said interior storage space, the liquid head of said supply container having a passageway extending between the exterior of said head and said inlet tube; each of said supply and remote container vapor heads including passageways, respectively extending between the exterior of each said vapor heads and the top of the storage space of the associated container to permit passage of overfill liquid and vapor between said vapor heads; the vapor and liquid heads on said remote container each having a normally closed valve in its respective passageway which closes that passageway, said normally closed valve being movable by a valve opening means to open said passageway to two-way passage of liquid and/or vapor; an inlet liquid transfer line extending between said liquid head of said supply container and the suction port of said pump; an outlet liquid transfer line connected at its inner end to the discharge port of said pump, and at its outer end to said liquid head of said remote container; a vapor transfer line connected between the vapor head of said storage container and the vapor head of said remote container, the outlet liquid and vapor transfer lines each having an initially closed valve which seals said transfer line; and valve opening means for opening the valves in said vapor and liquid transfer lines, and the valves in said liquid and vapor head passageways.

9. The combination of claim 8 wherein the outer ends of said outlet liquid and vapor transfer lines are connected, respectively, to the liquid and vapor heads of said remote container, each outer liquid and vapor transfer line having one of said normally closed valves, said valves in said transfer lines and liquid and vapor feed passageways of said remote container being spring-urged into their closed positions, and said valve opening means being coupling means on the outer ends of said outlet liquid and vapor transfer lines for automatically opening all of said valves when the outer ends of outlet liquid and vapor transfer lines are connected to said liquid and vapor heads of said remote container.

* * * * *

UNITED STATES PATENT AND TRADEMARK OFFICE
CERTIFICATE OF CORRECTION

PATENT NO. : 5,230,374
DATED : July 27, 1993
INVENTOR(S) : Dawson et al.

It is certified that error appears in the above-indentified patent and that said Letters Patent is hereby corrected as shown below:

Column 3, line 44, delete "2" and insert --1--.

Column 10, line 8, Claim 8, after "container" insert --for the transfer of said liquid to said remote container--.

Signed and Sealed this

Sixth Day of September, 1994

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO.   : 5,230,374
DATED        : July 27, 1993
INVENTOR(S)  : David W. Dawson and James E. Schoeckel It is certified that error appears in the above-identified patent and that said Letters Patent is hereby corrected as shown below:

Column 8,
Line 20, please delete "said container" and insert -- said liquid; a vapor transfer line having an inner end connected to said vapor head at the top of said liquid storage supply container, --

Signed and Sealed this

First Day of October, 2002

Attest:

Attesting Officer

JAMES E. ROGAN
Director of the United States Patent and Trademark Office